Feb. 6, 1968 P. R. PACKER ET AL 3,367,755

LAMINAR CONDUCTIVE MATERIAL HAVING COATS OF GOLD AND INDIUM

Filed Feb. 26, 1965 2 Sheets-Sheet 1

INVENTORS.
PARLEY R. PACKER,
ANDREW E. FLANDERS,

By John N. Haglwood
ATTORNEY.

Feb. 6, 1968 P. R. PACKER ETAL 3,367,755

LAMINAR CONDUCTIVE MATERIAL HAVING COATS OF GOLD AND INDIUM

Filed Feb. 26, 1965 2 Sheets-Sheet 2

INVENTORS.
PARLEY R. PACKER,
ANDREW E. FLANDERS,

By John N. Hazelwood
ATTORNEY.

United States Patent Office 3,367,755

Patented Feb. 6, 1968

3,367,755
LAMINAR CONDUCTIVE MATERIAL HAVING COATS OF GOLD AND INDIUM

Parley R. Packer, Alta Loma, and Andrew E. Flanders, Pomona, Calif., assignors to General Dynamics Corporation, Pomona, Calif., a corporation of Delaware Filed Feb. 26, 1965, Ser. No. 435,628
14 Claims. (Cl. 29—199)

ABSTRACT OF THE DISCLOSURE

Briefly, the disclosure is directed to a transmission or conductive material suitable for welding applications, particularly surface welding applications, and to an electroplating method for fabricating the material. The conductive material in the as-plated condition is of a laminar construction, e.g., a base metal with at least layers of indium and of gold applied thereon. The base metal may be nickel, copper, silver, chromium, nickel-iron alloy such as Kovar, each having atomic radii compatible with welding techniques. If desired, though not needed, a thin layer or flash of copper or other suitable metal may be interposed between the layers of indium and gold to improve adhesion therebetween and to prevent the slight contamination of the gold plating solution caused by a small amount of diffusion of the indium during the gold plating operation. However, the small amount of diffusion of the indium during gold plating is not sufficient to create any problems in the plating operation or produce any adverse effects on the gold layer. The layer of gold provides an easy manner of identifying the plated side of the material when the indium and gold layers are plated to a base metal having a different color than the gold.

This invention relates generally to electronic transmission material and methods for interconnecting electrical components, and more particularly to electronic transmission materials and to methods for the fabrication and interconnection thereof.

Electronic transmission materials which include a metallic coating which is fusible under welding operations to interconnect the material with a component lead, for example, are disclosed in U.S. patent applications Serial No. 294,644, now abandoned, and Serial No. 421,239, now abandoned, each assigned to the assignee of the present application.

This invention provides an improved electronic transmission material fabricated as by utilizing a tank plating arrangement in a manner similar to that disclosed in the above mentioned application Serial No. 421,239 but by substantially reducing the steps required in applying the fusible coating on the base material while maintaining substantially constant the thickness of the coating and the relative percentages of the fusible metals applied.

Briefly, the electronic transmission material of this invention comprises a sheet, strip, or ribbon laminar coated on at least one side with fusible material for interconnecting component leads, etc., of an electronic module, header board, or printed circuit board, or for other such applications. The material to which the electronic transmission material is connected may or may not be coated with the fusible material. Also a number of different metals may be used as the base metal of the sheet, strip, or ribbon, or may be joined by the fusible coating of the transmission material. The transmission material provides a simple yet effective mechanical and electrical connection which can be removed and reconnected many times without degradation of the quality of the mechanical or electrical interconnection.

Welding is employed in joining this electronic transmission material to a component lead or the like. Therefore, the problems associated with soldering heretofore encountered in using other methods for interconnecting are substantially eliminated. Interconnections requiring serviceability can be made where only one side of the transmission material is exposed and available to the welding electrodes by surface welding techniques as described hereinafter and in which conventional welding techniques cannot be employed.

Briefly, the surface welding technique, in conjunction with the unique laminar coating effects an interface bond between joined members. As pointed out above, at least one of the two members to be welded is laminar coated as described hereinafter and the members are positioned face to face with the coated surface or surfaces in abutment. The two electrodes of the welding machine are positioned on one side and in contact with the exposed surface of one of the positioned members to be welded with a predetermined pressure applied thereto. Energy is then rapidly applied in predetermined quantity through the electrodes, as a result of which heat is rapidly applied to an area localized to the material disposed intermediate the members being joined. The metal of the material is thereupon caused to diffuse, fuse and coact, creating a bond between the members which is strong in the shear direction but which may be broken by peeling and rewelded a number of times without degradation of the rewelded joint.

While the transmission material of this invention is particularly suitable for applications utilizing the above described surface welding techniques, it is not limited to surface welding applications as the material has very broad applications and can be welded by other types of welding techniques.

The fusible laminar coating can be applied to the surface of a printed circuit and/or another member, such as a component lead surface welded to the printed circuit; or the coating can be applied to a ribbon, strip or sheet of suitable base metal and welded to another member.

Accordingly, it is an object of this invention to provide a laminar electronic transmission material and method for fabricating the same.

A further object of the invention is to provide laminar constructed electronic transmission material which provides a strong, reliable interconnection when welded to another member, wherein the interconnection can be broken and rewelded a number of times with little or no adverse effect upon the subsequent interconnection.

A still further object of the invention is to provide a material having a fusible metal laminar coated on a base metal wherein the material can be joined to another element where only one surface of the members to be joined is available for welding electrode contact.

Another object of the invention is to provide a method of applying, by laminar application, a desirable fusible material to at least one surface of a base material or substrate while maintaining constant thickness and desired proportions of the fusible material applied.

Another object of the invention is to provide a method of making electronic transmission material which substantially reduces the required steps, thus providing a substantial economic saving while producing an effective serviceable, mechanical and electrical interconnection material.

Another object of the invention is to provide a method for applying to a suitable base metal a laminar coating of at least indium and gold wherein the percentage of indium by weight to the percentage of gold by weight is in a predetermined range and wherein the coating has a predetermined thickness.

Another object of the invention is to provide a method for fabrication of electronic transmission material which provides in the as-welded condition a percentage of indium by weight to gold by weight in a predetermined range which serves to provide a high shear strength quality while having a low peel strength quality of the weld.

Other objects of the invention not specifically set forth above will become readily apparent from the following description and accompanying drawings wherein.

Figure 1:
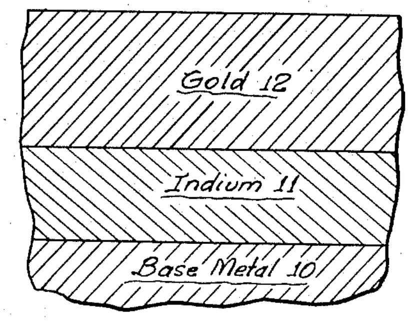
FIGS. 1 and 2 are cross-sectional views of embodiments of the electronic transmission material made in accordance with the invention.

Briefly, the invention is directed to a transmission or conductive material suitable for welding applications, particularly surface welding applications, and to an electroplating method for fabricating the material. The conductive material in the as-plated condition is of a laminar construction, e.g., a base metal with at least layers of indium and of gold applied thereon. The base metal may be nickel, copper, silver, chromium, nickel-iron alloy such as Kovar, each having atomic radii compatible with welding techniques. If desired, though not needed, a thin layer or flash of copper or other suitable metal may be interposed between the layers of indium and gold to improve adhesion therebetween and to prevent the slight contamination of the gold plating solution caused by a small amount of diffusion of the indium during the gold plating operation. However the small amount of diffusion of the indium during gold plating is not sufficient to create any problems in the plating operation or produce any adverse effects on the gold layer. The layer of gold provides an easy manner of identifying the plated side of the material when the indium and gold layers are plated to a base metal having a different color than the gold.

The advantages of the material of this invention over that illustrated and described in the above mentioned copending application Serial No. 421,239 is in the elimination of approximately 50% of the steps required to produce the material, thereby substantially reducing the cost thereof and greatly increasing the reliability of the material by the elimination of the large number of possible error producing steps.

While, as pointed out above, various metals may be utilized as the base metal, the description of the invention will be directed primarily to nickel as the base metal, for illustrative purposes only, and in no way should such description be considered as limiting the invention to this specific base metal.

The electronic transmission or conductive material of this invention in the as-plated condition constitutes the base metal, such as nickel, and a laminated coating constituted of layers of indium and gold, the layer of indium being plated on the nickel base material with the layer of gold being plated on the layer of indium. The thickness of each of the indium and gold layers are maintained within certain predetermined ranges since the thickness of the layers is directly related to the ratio of the indium to the gold by weight. As pointed out above, a flash of copper or other suitable material may be interposed between the layers of indium and gold, if desired.

It has been determined by testing that the amount of indium by weight with respect to the amount of gold by weight in the as-plated condition has proven satisfactory over the range of about 2% to about 20% indium to gold. Stated in another way, with the indium and gold considered as constituting 100%, about 2% to 20% would be indium and about 98% to 80%, respectively, would be gold. This ratio of indium to gold by weight is maintained regardless of the other metals utilized in the electronic transmission material.

The plated laminar coating thickness may be in the range between 150 to 500 microinches, however, a thickness of 250±50 (200–300) microinches over the entire one surface of the base metal is preferable. Plating in excess of 300 microinches in thickness will weld satisfactorily, however, this is more material than is required and thus uneconomical. On the other hand, with plating below 200 microinches in thickness, there is not adequate material to assure a good bond and therefore welding consistency is degraded. The thickness of the plated laminar coating is largely dependent upon physical factors such as the surface smoothness and on the percentages of indium to gold desired in the as-plated condition, and the thickness of the interposed flash of additional materials, where utilized. In applications where both surfaces to be welded are coated with the material of the invention, the thickness of each coating may be reduced so that the total thickness of both surfaces is in the range specified above.

In the as-welded condition, the interface bond of the transmission material, when utilized with nichel, is comprised primarily of nickel, gold, and indium. This ternary alloy may be considered to be predominantly composed of gold and nickel with the addition of indium to serve as a solid-state wetting or diffusant agent in addition to a hardening and an embrittling agent. When the transmission material of this invention utilizing nickel, for example, as the base metal, is welded to copper, for example, an interface quaternary alloy is created, which again exhibits properties of shear which are stronger than the base material and will therefore usually pull off the base copper metal member when removed.

Figure 3:
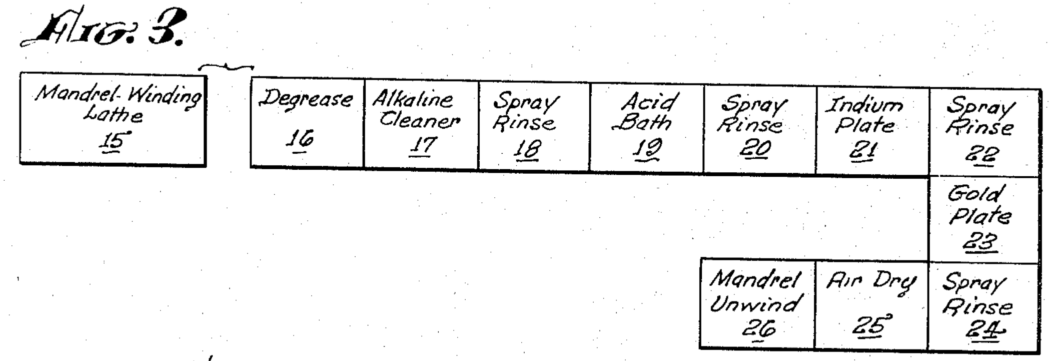
FIG. 3 is a diagrammatic illustration of a method for fabricating the transmission material.

In the exemplary tank plating process diagrammatically illustrated in FIG. 3 and described herein the base metal such as nickel ribbon is wound on a mandrel so that only one surface or face is exposed; the edges or sides of the ribbon are exposed due to slight curvature of the ribbon edges; the exposed surface or face of the ribbon is prepared for plating by both mechanical and chemical cleaning, if necessary; then a layer of indium is electroplated to the proper thickness in the vicinity of 10–100 microinches; this is followed by the final plating material, gold, which is plated to an approximate thickness of 150–240 microinches, depending on the percentages by weight of the indium and gold. A film or flash of copper or other suitable material may be electroplated to the indium prior to the plating of the gold thereto, if desired, the flash of interposed material serving primarily to increase adhesion between the indium and gold. After applying the final plating, the ribbon is dried and then unwound from the mandrel onto a spool or the like for later use. It is generally considered advisable in the process to follow each chemical bath, be it either etchant or plating, by one or two rinses, to be sure that one solution does not drag into the next solution and contaminate it. The mandrels are so constructed and placed in the solution tanks as to give reasonably uniform current density throughout the plating solution, as the current flows from the anode to the mandrel which serves as the cathode, thus providing a uniform plating throughout the length of the mandrel.

Figure 2:
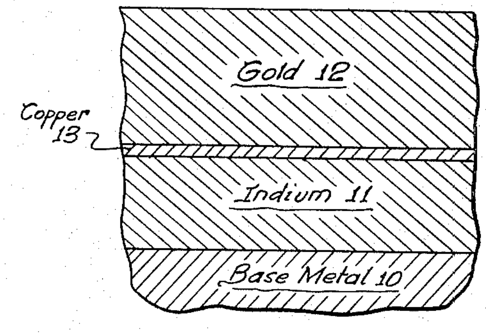

Referring now to the drawings, FIGS. 1 and 2 show representative layers of embodiments of the laminar constructed electronic transmission material of the invention. The FIG. 1 embodiment comprises a base metal 10 such as nickel, a layer 11 of indium having a thickness of approximately 10–100 microinches, and a layer 12 of gold having a thickness of approximately 150–240 microinches. As pointed out above, the specific thickness of the layers 11 and 12 is dependent on the percentage by weight of indium to gold desired in the as-plated condition of the material. By way of example, with a 15%/85% weight ratio of indium to gold, the approximate thickness of the respective layers is 80 and 170 microinches.

The FIG. 2 embodiment is essentially the same as that illustrated in FIG. 1 except that a film or flash 13 of copper has been interposed between the indium and gold layers 11 and 12, respectively. The copper flash 13, although its presence is not essential, provides the following features: (1) increases adhesion between the indium and gold layers; and (2) prevents the slight contamination of the gold plating solution due to slight diffusion of the indium during the gold plating operation. The flash 13, if desired, may be made with other metals which are compatible with indium and gold, for example silver.

The following is a sequence of steps for the preparation and plating of a base metal or substrate in ribbon form to produce the electronic transmision material, illustrated in FIG. 1. The preparation steps are the same as those described in the above cited application Ser. No. 421,239. Also set forth are the reasons for and results of each step. FIG. 3 diagrammatically illustrates the sequence of steps utilized in producing the FIG. 1 material. However, if desired, certain of the following steps may be modified.

*Preplating preparation*

(1) Close wind the base metal ribbon 10 to be plated (such as grade "200" annealed nickel) on a mandrel by mechanism such as a mandrel winding lathe indicated at 15 (see FIG. 3) such that only substantially one face or surface of the ribbon is exposed. This is to (1) hold the ribbon during the plating operation, (2) provide a means to plate large amounts of ribbon at one time due to the high ribbon density on the mandrel because of the relatively small width of the ribbon, and (3) protect the surface of the ribbon facing the mandrel against plating. The ribbon is thus easily handled and permits efficient use of plating personnel. Due to the slight curvature of the ribbon edges, a portion of the edges will be exposed. The ribbon, for example, is approximately 12 by 30 mils.

(2) At degrease station 16, the exposed face of the ribbon on the mandrel is wiped with MEK (methylethylketone) which is an organic cleaner and solvent which effectively removes grease and oils from surfaces to be plated. This results in a uniformly plated surface due to the removal of surface contamination. Hysol–PC–12–006 may be applied to the mandrel in areas where plating is not desired.

(3) Immerse the ribbon wound mandrel in an alkaline solution tank 17 for 5 minutes at 160° to 170° F. to further clean the ribbon in areas where the MEK may not have reached in step 2 and to remove contaminants which may be present that are not soluble in MEK. Due to the ribbon being cleaned of all possible contamination, a uniform electroplate will result.

(4) Rinse in cold running water at 18 for 1 to 2 minutes to remove the alkaline cleaner from the mandrel and the ribbon for preventing contamination of the next bath.

(5) Pickle (activate the ribbon) in hydrochloric acid solution 19 composed of 50% HCl for 1 to 3 minutes at room temperature to remove scale and oxidation from the to-be-plated surface or face to insure a more adherent surface.

(6) Rinse in cold running water at 20 for 1 to 2 minutes to remove the pickle solution from the mandrel and ribbon to prevent contamination of the indium tank solution.

*Plating*

(1) Electroplate the ribbon 10 prepared in the manner set forth in Steps 1–6 above, in an indium cyanide solution in tank 21 using cathode agitation at 15 amps/ft.$^2$ for about twelve minutes with the solution at room temperature. The thickness of the indium plated layer 11 is approximately 80 microinches and serves to strengthen the weld in the lower weld energy range. This effectively lengthens the plateau of the weld profile and ultimately provides a welded joint with the desired properties of high shear strength and low peel strength below the fusion energy range.

(2) Rinse in cold water at 22 for 1 to 2 minutes to remove the indium plating solution from the workpiece and thereby prevent contamination of the next solution.

(3) Electroplate the indium plated ribbon in an acid gold solution in tank 23 using cathode agitation and at 2.5 amps/ft.$^2$ for 28 minutes with the solution at 130° to 140° F. The thickness of the gold plated layer 12 is approximately 170 microinches and provides the gold for diffusion of the gold-nickel system that gives the bond its strength in the as-welded condition. The gold layer also serves for identifying the plated side of the ribbon and gives protection to the soft indium layer.

(4) Rinse in cold water at 24 for 1 to 2 minutes to remove the gold plating solution from the ribbon wound mandrel (specimen or workpiece), whereby the gold in the plating solution washed off the workpiece can be reclaimed and unnecessary loss of the precious metal prevented.

(5) Dry the mandrel and plated ribbon with an air blast at 25, thereby providing a shiny, streak free gold plate.

(6) Unwind the plated ribbon at 26 from the mandrel onto a spool or retainer mechanism for later use as desired.

The sequence of steps for the preparation and plating of a base metal to produce the electronic transmission material illustrated in FIG. 2 may be the same as set forth above with respect to the description of fabricating the FIG. 1 embodiment, except that after the rinsing of the indium plating solution from the workpiece, the following steps are interposed:

(1) Flash plate the indium plated ribbon in a cyanide copper solution in a tank (not shown) at 6 volts for 10 to 20 seconds with the solution at 130° to 140° F. This provides a very thin film 13 (10–20 microinches) of copper over the indium plate, thus slightly aiding in the application of the following gold plate.

(2) Rinse in cold water for 1 to 2 minutes to remove the copper plating solution from the workpiece to prevent contamination of the following gold plating solution.

Again the specific steps set forth above may be modified and some steps omitted if desired. However, higher quality transmission material is better assured under production conditions when the above steps are retained.

Satisfactory results for plating, adhesion, ratio of constituents, thickness and weld characteristics of the electronic transmission material have been obtained when made in accordance with this invention. Since the makeup and control of the solutions utilized in the above described method have a direct relationship to the material produced thereby, an example of the makeup of the solutions which can be used in the above described method is as follows:

(1) Alkaline cleaner—6 oz. of alkaline cleaner, such as Diversey #808, per gallon tap water.

(2) Hydrochloric acid pickle solution—50% by volume of 37% hydrochloric acid and 50% by volume of distilled or deionized water.

(3) Indium cyanide plate solution—Use concentrated indium plating solution, such as produced by Technic Inc., with no dilution. Concentration of this solution is with 4 oz./gallon of indium and 12 oz./gal. of free cyanide.

(4) Acid gold plating solution—One pound of a suitable additive, such as Orotemp Additive #1 made by Technic Inc., and 1 troy oz. of 24 kt. neutral gold (salts), such as Orotemp 24—24 kt. neutral gold made by Technic Inc., per gallon prepared as follows:

(A) Fill the container or tank to two-thirds full with distilled or deionized water and heat to 140° F.
(B) Add the additive and stir until completely dissolved.
(C) Add the 24 kt. gold salts and stir until completely dissolved.

(D) Add distilled or deionized water to bring up to operating level and mix thoroughly.

(E) Adjust pH to 5.0–7.0 if necessary, with reagent grade phosphoric acid or potassium hydroxide (a) to reduce the pH of the solution 0.1 unit, add 300 ml. reagent grade phosphoric acid per 100 gallons of working solution; (b) to raise the pH of the solution 0.1 unit, add 9 oz. of reagent grade potassium hydroxide per 100 gallons of solution.

(5) Cyanide copper plating solution—Mix 9.2 oz./gal. of sodium cyanide, 7.5 oz./gal. of copper cyanide, 7.5 oz./gal. of rochelle salts, and 4.0 oz./gal. of sodium carbonate with deionized water. After solution makeup, adjust the pH to 12.5 by adding sodium hydroxide. Maintain free sodium cyanide at 1.0 to 1.5 oz./gal.

As pointed out above, welding is employed in joining together members by utilizing the unique coating on at least one of the members. Also, many interconnection applications are of the type wherein only one side of the members to be joined is exposed and available to the welding electrodes, thus conventional welding means cannot be employed. Further, series welding with conventional material which might at first appear to offer a solution, is unsatisfactory since it does not provide a joint which permits separation and rejoinder without adverse effect to the rewelded joint. Such a joint is, however, provided by the surface welding method of this invention with the inclusion therein of an alloy (coating), as described above for example, which not only provides a strong reliable joint separable as desired, but also assures that the joint may be accomplished repetitively on a servicing basis with available welding equipment having certain characteristics.

Figures 4, 5:
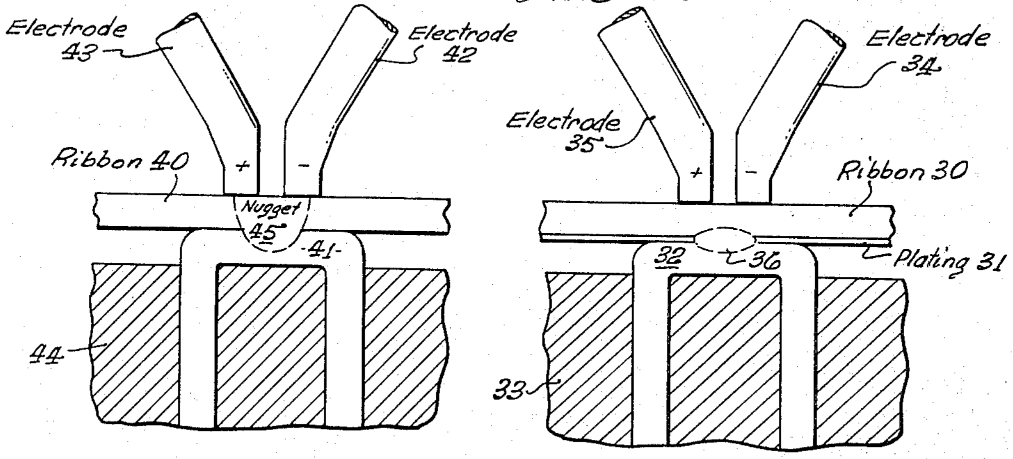
FIGS. 4 and 5 are cross-sectional views of typical welding setups for welding with the material of the invention and welding without the material of the invention, respectively.

In FIG. 4 there is shown an arrangement for accomplishing welding of a strip, ribbon, or member 30, having a coating of fusible material applied thereto as described above and generally indicated at 31, to a terminal member 32 which is shown positioned in a module 33. A pair of welding electrodes 34 and 35 of rectangular cross-section are positioned upon the exposed surface of member 30 at a position immediately above underlying terminal member 32. It will be noted that because of the underlying terminal member support afforded by the module 33, the exposed upper surface of member 30 is the only member surface available to the welding electrodes. With rapid application of welding energy and with appropriate electrode pressure, a surface weld is effected at interface bond or zone 36.

It is thus seen, that surface welding depends upon a dissimilar metal plating or coating applied to one or both of the adjoining faces of the two pieces of material. Heat with pressure is applied so that the plated metal diffuses and/or incipiently fuses to create a strong bond. Incipient fusion being herein defined as the states of a material in the region of maximum solidus temperature immediately below the liquidus state. Usually a small amount of the parent ribbon (member 30) material enters into the bonded region by alloying with the plating. The mutually diffused material is normally confined to the thin interface layer 36 whose physical strength exceeds that of the plating and often that of the parent material. A unique characteristic of a proper transmission material surface weld is that while the bond is often as strong or stronger than the base metal, the weld may be separated by the proper peel technique without damaging or distorting the terminal 32, for example. This permits another ribbon conductor (member 30) to be rewelded many times to a given terminal. In addition, the material immediately under and between electrodes 34 and 35 is usually only sufficiently elevated in temperature so as to approach its melting temperature. Thus, stress at the usual nugget interface is avoided and the original grain structure and material strength properties are not disturbed.

While the techniques applicable in achieving a surface weld joint as illustrated in FIG. 4 are very similar to the resistance welding method known as "series" welding or "parallel gap" welding illustrated in FIG. 5. The FIG. 5 method makes a lap-joint of members 40 and 41 where only one face is available for application of the welding electrodes 42 and 43 since terminal member 41 is supported in a module 44. In series welding, as in surface welding, current flows from one electrode, through the material, and returns by way of the other electrode. However, in series welding the heat generated by current passing through the material 40 is sufficient to create a "nugget" or fused portion 45 common to both pieces in that it extends the entire depth of upper member 40 and a substantial distance into lower member 41. As is characteristic of any good conventional weld, the act of separating the welded piece will result in damage and distortion of one or both of the joined members.

The utility of the material of this invention is thus clearly shown by the contrast between the surface welding application of FIG. 4 and the conventional series welding application of FIG. 5.

Figure 6:
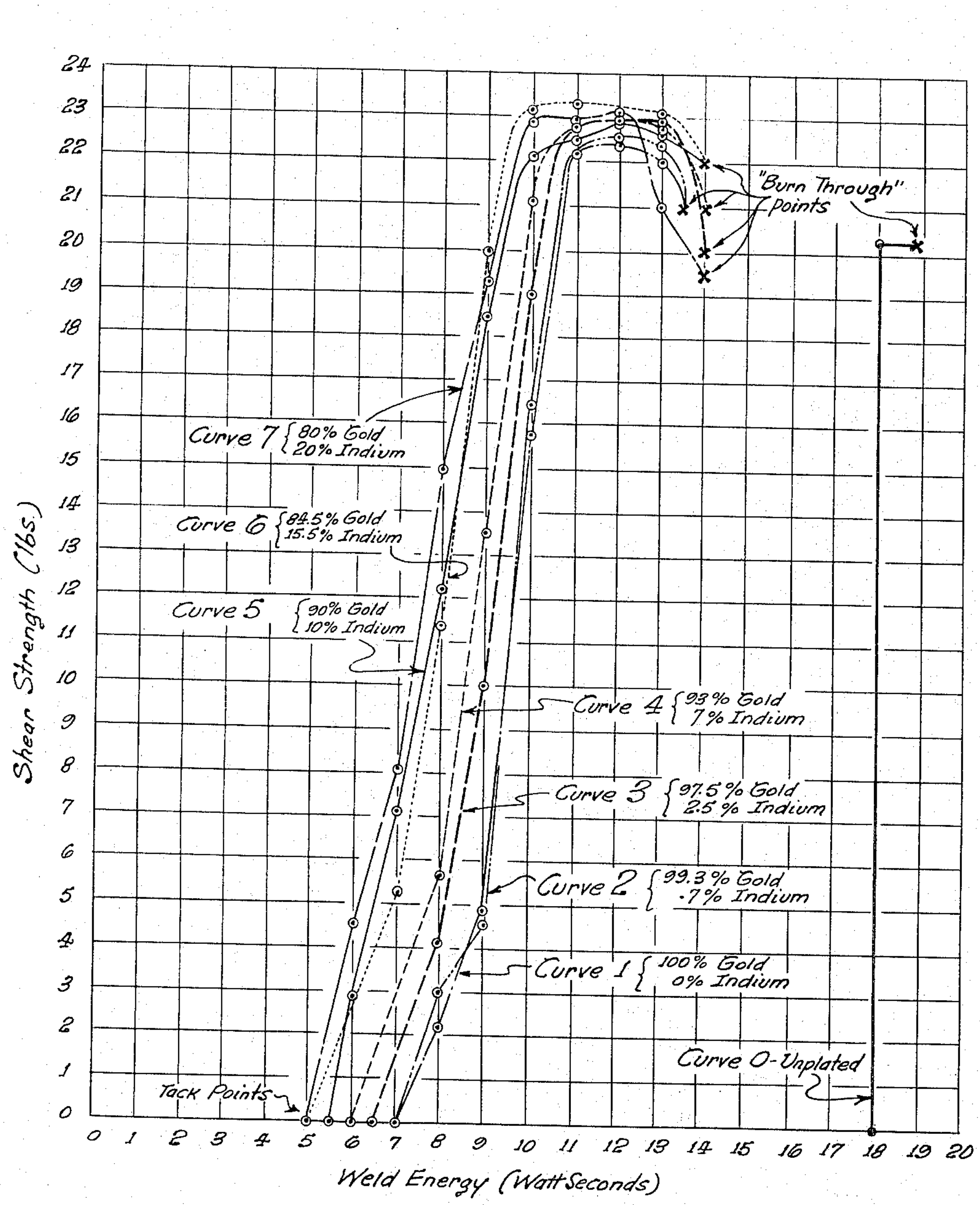
FIG. 6 is a graph illustrating characteristics of conventional material and the transmission material of this invention as-plated with various percentages of gold and indium.

Weld profile properties are distinctly different when welded without the fusible coating or plating as compared to being welded with the plating. As shown in FIG. 6, the weld with conventional material (see curve 0), such as a strip or ribbon of nickel, develops the desired strength over a very narrow energy range, often requiring control of the weld energy to within a few percent variation even though dynamically controlled welders have been recently developed to permit wider use of this welding technique. The other curves illustrated in FIG. 6 and described in detail below clearly demonstrate the availability of a broad energy tolerance welding combination with the use of plated material. With the exception of curve 1, an energy tolerance in the order of ±20% is acceptable compared to a tolerance in the vicinity of an order of magnitude less, this being due to a curve 1 being plated with 100% gold and not in accordance with this invention. Also, curve 1 has other undesirable features as later described. As shown in FIG. 6, the more rounded profile in this case is a cool surface weld and the profile with the broad plateau is a typical surface weld in which the physical and welding parameters have been properly determined. The flat of the plateau to the right of the knee is established by the breaking (shear) strength of the ribbon. Since the weld strength generally exceeds the nickel ribbon strength throughout this region of the weld profile, very few welds fail in shear. Under cool surface-weld conditions, as exemplified by curves 2–7, the weld always peels. The peeling condition, however, becomes questionable for energies within a few percent of the burnout point using the parameters established for the broad plateau curve.

Since diffusion is dependent on time as well as temperature, the pulse time affects the weld profile. A short pulse does not provide adequate time for good heat penetration prior to melting the top surface and is too brief to permit good mutual diffusion. The pulse time or pulse dwell should be adequate to permit mutual diffusion and the change of state from initial plasticity to final "freezing" of the materials being welded. Thus different welders and/or different materials and thermal masses being welded will require different pulse times.

Surface welds tolerate a wide range in electrode pressure. Good welds are obtained above a certain minimum pressure; the maximum pressure, which may be approximately twice the minimum value, is usually limited by other considerations. The electrode pressure varies by the types of welders used and the materials being welded.

The electrode spacing is another parameter of surface welding although it is not critical. A good rule of thumb is to select a convenient spacing approximately twice the material thickness. At least a two to one range in selected electrode spacing is usually tolerable. However, from an energy variation standpoint it is recommended that the selected spacing be maintained to within ±20% when not using dynamically controlled power supplies.

Certain metallurgical aspects of a surface weld are helpful in understanding the physical and electrical properties. The nature of current penetration has been shown by microsections of the weld in the region immediately below the inner heel of one of the electrodes at very near maximum permissible weld energy, which heat affected zone indicates the nature of the current pulse wave as it enters the material and generates heat. The high positive resistivity temperature coefficient of nickel provides this highly desirable property, which causes virtually instantaneous heat availability at the joining interface to elevate the materials to the proper diffusion temperature. This phenomenon does not make the weld dependent upon the relatively sluggish thermal flow that emanates from the top highly heated surface.

When viewing sectional microphotographs of service welds utilizing the material of this invention the following conditions are noted. Near the heels of the electrodes undisturbed grain structure of the parent material can be seen. In the vicinity of the outermost regions of the jointed interface there are light appearing lines that are the alloy plating material in its substantially original material state. In the center of the interface region is a dark appearing line; this is the mutually diffused region where the surface weld occurs. In between the surface weld and the outer plated regions are feathered transitional zones. These thinned zones not only provide appreciably diffused states with sound metallurgical properties, but a phenomenon known as "thin-film adhesion" is believed to exist, particularly in the outer thin regions and in the immediate nearby vicinity of the original plating. The theory is that two metal surfaces placed in intimate contact, separated by a film sufficiently thin, have the same molecular adhesion as in one discrete piece of metal. Electrons are expected to flow somewhat as readily in these outer regions as in the parent material.

Upon further magnification of the actual surface weld area described directly above, the dark appearing line has an appearance similar to the "bead" obtained in oxy-acetylene welding. The bead-like structure is thought to be a highly ordered metallic crystal structure similar to a perfectly grown monolithic dendrite. Diffusion formations may be seen by virtue of the striations on either side of the surface weld "bead." This highly ordered crystal lattice offers an explanation for the very high strength exhibited by the surface weld of the electronic transmission material of this invention. However, sound surface welds may also be formed without developing the bead-like structure. These welds are formed under relatively cool interface temperatures and are perfectly satisfactory. Excellent bonds are developed in the vicinity well below incipient fusion but sufficient molecular mobility does not exist to permit growth of the highly ordered crystalline structure described above.

The severability feature of a properly controlled surface weld is highly desirable for many applications from a servicing viewpoint. The weld may be separated easily in a peeling manner much like a can is opened with a key. The ribbon or material is cut near the weld and the small end beyond the weld is pried up slightly. The lifted end is grasped between the tips of an appropriate tool, similar to long nosed pliers, with a firm grip and the tool rolled upon one of its radii in the direction toward the weld. Depending upon the convenience of approach, the tool which incorporates radii on its sides as well as its tip end may be placed on its side and rolled with a twist of the wrist, or the tool may be placed on end and rolled over. This technique provides a nearly neutral force axis near the interface if a slight downward pressure is applied during the rolling motion. This virtually eliminates the extracting force that otherwise might be placed upon the terminal. Many rewelds to a given terminal may be accomplished with no loss in strength with successive welds.

Since a slight buildup of the alloy develops after each peel, it is sometimes desirable that the excess material be removed by a few deft strokes of a smoothing file after a number of rewelds have been made on the same terminal.

As pointed out above, one of the novel features of the electronic transmission material of this invention is its pull or shear strength combined with its inherent capability of being welded to an element, broken or peeled from the element at the welded point, and rewelded at the same point. It has been shown that this sequence can be repeated a relatively large number of times without adverse effects upon the strength of the weld or the electrical qualities thereof.

Tests have been conducted to determine the proper weld energy range for making welds utilizing the material of this invention and to verify the welding characteristics; namely, tack point, shear or pull strength, and peel strength. By establishing data as set forth hereinafter, it can be determined which weld energy setting for the specific welding equipment being utilized produces the desired shear strength of the type of material being utilized to produce the repairable weld. Practically every different combination of indium and gold by weight utilized in the material of the invention requires a slightly different weld energy setting and produces different shear and peel characteristics. In addition, different batches of the base metal will produce slight weld energy differences. Also, it should be noted that energy settings may vary due to the variations in the power supply and the internal and external conditions of the welding equipment. Also, different types of welders have different internal characteristics and thus produce variations in the weld energy settings.

FIG. 6 and the following charts illustrate, by way of example, the following:

(1) Tack point—Point at which the weld begins to tack, which has been shown to be of a weld energy between 5.5 to 7.5 watt seconds for a particular weld equipment set up.

(2) Shear (pull) strength—The number of pounds pressure (pull) required to shear or break the material. For example, with a power supply at 1.5 times the average tack point energy, the welds should preferably test to destruction at a shear strength of 10 lbs. or above, or with a power supply at 11 watt seconds, each weld should test to destruction at a shear strength of 14 lbs. or above.

(3) Peel strength—The number of pounds pressure (pull) required to peel the transmission material from the element to which it was welded. For example, with the power supply set at 11 watt seconds, each weld should preferably peel at between 2.5 to 6 lbs., although satisfactory welds have been produced with values above the preferred range and lower strengths are extremely rare. Generally, it has been determined that the higher percentages of indium tend to indicate a reduction in peel strength to a certain point.

(4) No peel point—The point at which no peel occurs; i.e., a fusion weld is obtained. Thus with the power supply at 14 watt seconds, for example, any of the material which will not peel from the weld is considered unsatisfactory for maximum effectiveness.

While the following examples have been made utilizing surface welding techniques, the same weld characteristics of the material can be produced with other types of welding operations, such as the cross or pincer (resistance) welding technique.

FIG. 6 graphically illustrates the shear or pull strength qualities of examples of electronic transmission material utilizing various weld energy settings and based on the following information. Each of the welds were made with a weld energy pulse of 9 milliseconds total duration.

Curve No. 1: Composed of a layer of 100% gold plated on a nickel base metal. A peel strength of 5.7 lbs. was obtained at 11 watt-seconds weld energy. However, the number of repeatable welds that can be made utilizing 100% gold plated material is very limited.

| Energy (watt-sec.) | Av. shear strength (lbs.) |
|---|---|
| 7 | tack point |
| 8 | 2.2 |
| 9 | 4.9 |
| 10 | 15.8 |
| 11 | 22.2 |
| 12 | 22.2 |
| 13 | 22.0 |
| 13.5 (burn through) | 21.0 |

Curve No. 2: Composed of electronic transmission material with nickel as the base metal and with about 99.3% gold by weight to about 0.7% indium by weight in the as-plated condition. A satisfactory peel strength of 3.8 lbs. was obtained at 11 watt-seconds weld energy.

| Energy (watt-sec.) | Av. shear strength (lbs.) |
|---|---|
| 7 | tack point |
| 8 | 3 |
| 9 | 4.6 |
| 10 | 16.4 |
| 11 | 22.2 |
| 12 | 22.5 |
| 13 | 22.3 |
| 13.5 (burn through) | 21.0 |

Curve No. 3: Composed of electronic transmission material with nickel as the base metal and with about 97.5% gold by weight to about 2.5% indium by weight in the as-plated condition. A peel strength of 3.7 lbs. was obtained at a weld energy setting of 11 watt-seconds.

| Energy (watt-sec.) | Av. shear strength (lbs.) |
|---|---|
| 6.5 | tack point |
| 8.0 | 4.2 |
| 9.0 | 10.1 |
| 10.0 | 19.0 |
| 11 | 22.8 |
| 12 | 22.9 |
| 13 | 23.0 |
| 14 (burn through) | 20.0 |

Curve No. 4: Electronic transmission material composed of base metal of nickel and with about 93% gold by weight to about 7% indium by weight in the as-plated condition. With a weld energy setting of 11 watt-seconds, a peel strength of 3.4 lbs. was obtained.

| Energy (watt-sec.) | Av. shear strength (lbs.) |
|---|---|
| 6.0 | tack point |
| 8.0 | 5.7 |
| 9.0 | 13.5 |
| 10.0 | 21.1 |
| 11 | 22.8 |
| 12 | 22.9 |
| 13 | 22.5 |
| 14 (burn through) | 21.0 |

Curve No. 5: Composed of electronic transmission material with nickel as the base metal and with about 90% gold by weight to about 10% indium by weight in the as-plated condition. With a weld energy setting of 11 watt-seconds a peel strength of 3.8 lbs. was obtained.

| Energy (watt-sec.) | Av. shear strength (lbs.) |
|---|---|
| 5.5 | tack point |
| 6.0 | 2.8 |
| 7 | 7.1 |
| 8 | 12.3 |
| 9 | 18.4 |
| 10 | 22.2 |
| 11 | 22.5 |
| 12 | 22.8 |
| 13 | 22.6 |
| 14 (burn through) | 22 |

Curve No. 6: Electronic transmission material composed of nickel as the base metal and with about 84.5% gold by weight to about 15.5% indium by weight in the as-plated condition.

| Energy (watt-sec.) | Av. shear strength (lbs.) |
|---|---|
| 5 | tack point |
| 7 | 5.3 |
| 8 | 11.3 |
| 9 | 19.8 |
| 10 | 23.2 |
| 11 | 23.2 |
| 12 | 23.2 |
| 13 | 23.2 |
| 14 | 23.2 |
| 15 (burn through) | 22.0 |

Curve No. 7: Composed of electronic transmission material with nickel as the base metal and with about 80% gold by weight to about 20% indium by weight in the as-plated condition. A peel strength of 3.8 lbs. was obtained at a weld energy setting of 11 watt-seconds.

| Energy (watt-sec.) | Av. shear strength (lbs.) |
|---|---|
| 5 | tack point |
| 6 | 4.5 |
| 7 | 8.1 |
| 8 | 14.9 |
| 9 | 19.3 |
| 10 | 22.9 |
| 11 | 22.9 |
| 12 | 23.1 |
| 13 | 21.0 |
| 14 (burn through) | 19.5 |

As more clearly seen on the FIG. 6 graph, it is desirable to utilize fusible material in the range between about 2% and 20% indium by weight to gold by weight, particularly between about 7% and 17% indium to gold by weight, as set forth above. Curves No. 3 to 6 show the desirable qualities of the preferred percentage of indium to gold with the lower portion of the curves forming a substantially straight line as compared with the backward bend in the lower portion of Curves 1 and 2. However, material made with the percentages illustrated in Curve No. 2 produces satisfactory weld characteristics even though the lower portion of the curve has a slight backward bend. Therefore, as illustrated by the FIG. 6 graph, it is preferable to utilize the percentages of indium to gold that will produce a shear strength-weld energy curve that will produce a substantially straight line from the tack point to the elbow of the plateau of the curves, with the plateau indicating the amount of variation in weld energy setting without decreasing the shear strength of the weld. While the low and high percentages of indium to gold (see Curves 2 and 7) produces satisfactory welds, the plateau of each curve is relatively short as compared with the plateau of the curves utilizing a percentage of indium to gold in the range of about 7 to 17 by weight and thus the weld energy settings must be more accurately controlled to maintain the desired shear strength.

By the utilization of the curves of FIG. 6 for example, it can be determined which weld energy setting for the specific welding equipment being utilized produces the desired shear strength of the type of electronic transmission material to be welded. As set forth above, the energy settings vary due to the variations in the power supply and the internal and external conditions of the welding equipment. Also, different types of welders have different internal characteristics and thus produce variations in the weld energy setting. In addition, the energy will vary with terminal contact area or thermal mass. For example, with the specific type of welder used to produce the data of FIG. 6, it has been determined that with the transmission material of this invention the weld energy setting should be approximately 11 watt seconds to produce a weld having these desirable characteristics, this setting allowing for variations in the energy setting which are greater than the normal variations of the welder.

It has thus been shown that this invention comprises an electronic transmission material, and method of fabricating the same, which has in the as-plated condition a specific range of indium by weight to gold by weight which produces a weld which can be peeled off and rewelded a relatively large number of times without adverse effects on the characteristics of the weld. While specific methods for producing specific embodiments of the electronic transmission material have been illustrated and described, the manner of making transmission material having the desirable as-plated percentages by weight of indium to gold is not limited to the specifics described and illustrated. While it is desirable to prevent the sides of the base material from being plated, overlap on the sides is permissible. Also, if desired, all surfaces of the ribbon may be plated.

In addition to the uses of the material of the invention as specified above, the peelable feature of the material gives many applications in the mechanical field such as, for example, a means of opening containers or providing a repairable container opening.

Although particular embodiments of the material and methods for making the same have been illustrated and described, modifications and changes will become apparent to those skilled in the art, and it is intended to cover, in the appended claims, all such modifications and changes as come within the true scope and spirit of this invention.

What we claim is:

1. A laminar conductive material comprising a base metal selected from the group consisting of nickel, copper, silver, chromium, and nickel-iron alloys and a plurality of layers of different metals plated on at least one surface of said base metal, said plurality of metals being composed of indium and gold, the indium layer being adjacent the base metal and in the range of about 2 to 20 percent by weight as compared to the gold by weight.

2. The laminar conductive material defined in claim 1, wherein said plurality of layers of different metals have a thickness in the range between 200 and 300 microinches.

3. A laminar conductive material particularly adapted for surface welding applications comprising in the as-plated condition a base metal selected from the group consisting of nickel, copper, silver, chromium and nickel-iron alloys, a plurality of layers of different metals plated on at least one side of said base metal, said metals being composed of indium and gold with the indium adjacent the base metal and in the range of about 2 to 20 percent by weight as compared to the gold by weight, whereby a surface weld can be produced which has a high shear strength quality while having a low peel strength quality.

4. Electronic transmission material comprising a base metal selected from the group consisting of nickel, copper, silver, chromium, and nickel-iron alloys, a layer of indium plated to the base metal, and a layer of gold plated to the layer of indium, the indium being in the range of about 2 to 20 percent by weight compared to the gold by weight.

5. The transmission material defined in claim 4, wherein the layers of indium and gold have a combined thickness in the range between 200 and 300 microinches.

6. Electronic transmission material comprising a base metal selected from the group consisting of nickel, copper, silver, chromium, and nickel-iron alloys, a layer of indium plated to the base metal, and a layer of gold plated to the layer of indium, the indium being in the range of about 7 to 17 percent by weight compared to the gold by weight.

7. Electronic transmission material comprising a base metal of nickel and a plurality of layers of different metals, said plurality of layers of different metals consisting of a layer of indium, a layer of gold, and a layer of a suitable adhesion-increasing metal interposed between the layers of indium and gold, the indium being in the range of about 2 to 20 percent by weight compared to the gold by weight.

8. The transmission material defined in claim 7, wherein said plurality of layers of different metals have a thickness in the range between 200 and 300 microinches.

9. The laminar conductive material defined in claim 1, wherein said plurality of layers of different metals also includes a layer of adhesion-increasing metal interposed between the layers of indium and gold.

10. The laminar conductive material defined in claim 3, wherein said plurality of layers of different metals also includes a layer of adhesion-increasing metal interposed between the layers of indium and gold.

11. The transmission material defined in claim 4, additionally includes a thin layer of adhesion-increasing metal interposed between the layers of indium and gold.

12. A laminar conductive material comprising a base metal and a plurality of layers of different metals plated on at least one surface of said base metal, said plurality of metals being composed of indium and gold, the indium layer being adjacent the base metal and in the range of about 2 to 20 percent by weight as compared to the gold by weight, said plurality of layers of different metals also including a layer of metal selected from the group consisting of copper and silver interposed between said layers of indium and gold.

13. Electronic transmission material comprising a base metal, a layer of indium plated to the base metal, a thin layer of copper plated to the layer of indium, and a layer of gold plated to the layer of copper, the indium being in the range of about 2 to 20 percent by weight compared to the gold by weight.

14. Electronic transmission material comprising a base metal of nickel and a plurality of layers of different metals, said plurality of layers of different metals consisting of a layer of indium, a layer of gold, and a layer of a suitable adhesion-increasing metal interposed between the layers of indium and gold selected from the group consisting of silver and copper, the indium being in the range of about 2 to 20 percent by weight compared to the gold by weight.

References Cited

UNITED STATES PATENTS

| | | | |
|---|---|---|---|
| 2,409,983 | 10/1946 | Martz | 204—45 |
| 2,417,967 | 3/1947 | Booe | 29—199 X |
| 2,438,967 | 4/1948 | Ellsworth | 29—183.5 |
| 2,525,887 | 10/1950 | Frazier | 29—199 |
| 2,925,643 | 2/1960 | Haayman | 204—40 X |
| 3,000,085 | 9/1961 | Green | 29—199 X |
| 3,206,698 | 9/1965 | Allen | 29—195 X |
| 3,259,556 | 7/1966 | DeNautt | 204—15 X |

HYLAND BIZOT, *Primary Examiner.*